(12) United States Patent
Snyder et al.

(10) Patent No.: US 10,370,113 B2
(45) Date of Patent: Aug. 6, 2019

(54) FLOW DRAG MITIGATION DEVICE

(71) Applicant: Shield Aerodynamics LLC, Pine Bluff, AR (US)

(72) Inventors: Dennis Snyder, Pine Bluff, AR (US); Wayne Duncan, Pine Bluff, AR (US)

(73) Assignee: Shield Aerodynamics LLC, Pine Bluff, AR (US)

( * ) Notice: Subject to any disclaimer, the term of this patent is extended or adjusted under 35 U.S.C. 154(b) by 295 days.

(21) Appl. No.: 15/328,022

(22) PCT Filed: Jul. 23, 2015

(86) PCT No.: PCT/US2015/041794
§ 371 (c)(1),
(2) Date: Jan. 21, 2017

(87) PCT Pub. No.: WO2016/064455
PCT Pub. Date: Apr. 28, 2016

(65) Prior Publication Data
US 2017/0190437 A1 Jul. 6, 2017

Related U.S. Application Data

(60) Provisional application No. 62/027,972, filed on Jul. 23, 2014.

(51) Int. Cl.
| | | |
|---|---|---|
| *B64D 33/02* | (2006.01) | |
| *B64C 7/00* | (2006.01) | |
| *B64C 7/02* | (2006.01) | |
| *B64D 29/00* | (2006.01) | |
| *B64C 21/10* | (2006.01) | |
| *B64D 15/00* | (2006.01) | |
| *B64D 29/06* | (2006.01) | |
| *F04D 29/52* | (2006.01) | |

(52) U.S. Cl.
CPC ............. *B64D 33/02* (2013.01); *B64C 7/00* (2013.01); *B64C 7/02* (2013.01); *B64C 21/10* (2013.01); *B64D 15/00* (2013.01); *B64D 29/00* (2013.01); *B64D 29/06* (2013.01); *F04D 29/522* (2013.01); *B64D 2033/0206* (2013.01); *B64D 2033/0226* (2013.01); *B64D 2033/0233* (2013.01)

(58) Field of Classification Search
CPC .... B64D 2033/0206; B64D 2033/0233; B64D 2033/0226; B64D 2033/022
See application file for complete search history.

(56) References Cited

U.S. PATENT DOCUMENTS

| | | |
|---|---|---|
| 5,743,488 A | 4/1998 | Rolston et al. |
| 5,915,403 A | 6/1999 | McConachie et al. |
| 6,179,249 B1 * | 1/2001 | Canadas ............... B64D 29/00 244/129.4 |

(Continued)

*Primary Examiner* — Brian M O'Hara (57) ABSTRACT

A mitigating system for reducing flow drag in aircraft engines uses a mitigating device attached to either the nacelle of an engine to mitigate the flow drag of the airflow moving across the nacelle. The mitigating device has an inner sleeve and an outer sleeve, each of which can be adjusted separately to extend any desired length across the inner surface or outer surface of the nacelle. As the sleeves are extended, they cover a greater number of flow drag elements thereby improving the aerodynamic properties of the aircraft engine.

19 Claims, 5 Drawing Sheets

(56) References Cited

U.S. PATENT DOCUMENTS

| 7,469,862 B2 * | 12/2008 | Layland ............... B64D 15/12 |
| | | 244/134 D |
| 2006/0237582 A1 | 10/2006 | Layland et al. |
| 2008/0016844 A1 | 1/2008 | Shutrump |
| 2009/0092482 A1 | 9/2009 | Winter |
| 2012/0126062 A1 | 5/2012 | Stewart, III |

* cited by examiner

PRIOR ART

FLOW DRAG MITIGATION DEVICE

CROSS-REFERENCE TO RELATED APPLICATIONS

This application claims the benefit of U.S. provisional patent application No. 62/027,972, filed on Jul. 23, 2014, and entitled "System to Mitigate Laminar Flow Drag." Such application is incorporated herein by reference in its entirety.

BACKGROUND

The present invention relates to aircraft engines, more specifically to a nacelle, which can include an inlet area, a nose cowl area, and a fan cowl area for turbine engines, and a mitigation device to be fitted over a nacelle or other areas on an aircraft in order to reduce flow drag.

Flow drag not directly associated with the production of lift is referred to as parasitic drag, which is composed of drag of various aerodynamic components. Important to the current invention is skin friction drag, which is the drag on a body resulting from friction over its contact surfaces. There are mainly two cases where the flow in the boundary layer is entirely laminar or entirely turbulent over the surface. In a usual application the boundary layer is normally laminar near the leading edge of the object undergoing transition to a turbulent layer at some distance back along the surface.

For an aircraft engine nacelle, it has been calculated that the critical area of concern is the first one-third of the nacelle, or 30 inches back from the leading edge where a laminar boundary layer begins to develop at the leading edge. Downstream from the leading edge the laminar boundary becomes unstable and is unable to suppress disturbances imposed on it by surface roughness or fluctuations in the free stream. Every component or element that has direct contact with airflow, including rivets, joints, seams, and fasteners, has an aerodynamic friction and can product drag.

Skin gaps or irregular matching seam-surfaces and recesses often cause location transition from laminar to turbulent flow. One area of interest is gaps or joints, such as at the interface between the lipskin and nose cowl and at the interface between the nose cowl the fan cowl. Another area of concern is nacelle lipskins that have been damaged and/or repaired. This is a common occurrence and introduces new drag potential.

Benefits of laminar flow come in the form of reduced friction drag. Because nacelle friction drag has been approximated to account for 4-5% of the total friction drag of the aircraft, any reduction in nacelle friction drag causes a corresponding reduction in fuel consumption and aircraft operating costs. Thus, it is desirable to maintain laminar flow over as much of the nacelle surface as possible.

A number of designs exist seeking to reduce drag over a nacelle associated with irregular surfaces and joints or surface gaps. Some, such as is described in U.S. Pat. No. 2,873,931, utilize an air blowing system. Others, such as is described in U.S. Pat. No. 5,368,258, utilize a suction chamber within the nacelle. While certain of such existing designs may well benefit new engine structures, these solutions require the owner of an existing aircraft to remove nacelle parts and replace them with new complex systems, having multiple working components. While the future trend is to integrate the inlet lipskin into the nose cowl and fan cowl sections to avoid connections of separate nacelle sections, greater than 99% of all currently in-service aircraft having nacelles remain with the separate-section construction. Removing an existing nacelle and replacing it with a composite, one-piece nacelle is cost prohibitive. There is a need to provide a drag reduction device that is cost effective for existing aircraft with a design that is scalable and adaptable for multiple areas and the many sizes and shapes of aircraft nacelles and intakes.

BRIEF SUMMARY

The present invention is directed to a system to mitigate flow drag and boundary layer separation over selected areas of the surface of an intake duct or nacelle or other areas of an aircraft by mitigating flow drag caused by interruptions in the surface of an aircraft intake or nacelle, such as, but not limited to, rivets, fasteners, joints, seams, cracks, and irregularities in surface smoothness. In certain embodiments, the invention serves to mitigate flow drag and boundary layer separation over selected areas of the inner surface or throat of an intake duct or nacelle by mitigating flow drag and boundary separations caused by interruptions in the inner surface of an aircraft intake or nacelle, such as, but not limited to, rivets, fasteners, joints, seams, cracks, and irregularities in surface smoothness. In certain embodiments, the invention serves to mitigate flow drag and boundary layer separation over selected areas of the inner surface of an intake duct or nacelle by mitigating flow drag caused by interruptions in the surface of an aircraft intake or nacelle, such as, but not limited to, rivets, fasteners, joints, seams, cracks, and irregularities in surface smoothness. In certain embodiments, the invention can be adapted to the dimensions and curvatures of existing lipskins, to cover only the lipskin when damaged and to improve the aerodynamics of same where applicable, and/or to provide a replacement for the lipskin that may be a part of an extended segment that interfaces with the nose cowl or extends farther aft on the nacelle to interface with the fan cowl or beyond.

In certain embodiments, the invention serves to mitigate flow drag and boundary layer separation over selected areas of the surfaces of an intake duct or nacelle by mitigating flow drag caused by interruptions in the surfaces of an aircraft intake or nacelle, such as, but not limited to, rivets, fasteners, joints, seams, cracks, and irregularities in surface smoothness. In certain embodiments, the invention has a design based on the dimensions and curvatures of an existing lipskin, such that potential drag from rows of rivets, fasteners, and joins can be mitigated by extending aft of the lipskin edge over the interface between the lipskin and the nose cowl.

In certain embodiments, the invention serves to mitigate flow drag and boundary layer separation over selected areas of the surface of an intake duct or nacelle by mitigating flow drag caused by interruptions in the surface of an aircraft intake or nacelle, such as, but not limited to, rivets, fasteners, joins, seams, cracks, and irregularities in surface smoothness, where the design of the device is based on the dimensions and curvatures of an existing lipskin. To mitigate potential drag from rows of rivets, fasteners, and joints, and at the lipskin/nose cowl and the nose cowl/fan cowl interfaces the system in certain embodiments is capable of extending aft of the lipskin edge, over the interface between the lipskin and the nose cowl and fan cowl. To mitigate further potential drag in certain embodiments the system includes a means for airflow to be directed over the lipskin/nose cowl/fan cowl interface joints.

Certain embodiments of the present invention are directed to a system to mitigate flow drag and boundary layer separation that further provides a low coefficient of friction surface and/or a self-cleaning surface and/or an acoustic-absorbing material and/or a means of de-icing and/or anti-icing, such as, but not limited to, a compressor bleed air inlet, an electronic or electric heating system, and/or an anti-icing material or coating.

Certain embodiments of the present invention are directed to a system to mitigate flow drag and boundary layer separation that further provides a means for and method of attaching a forward material or object, such as but not limited to an engine protection device, to the nacelle.

DETAILED DESCRIPTION

Figure 1:
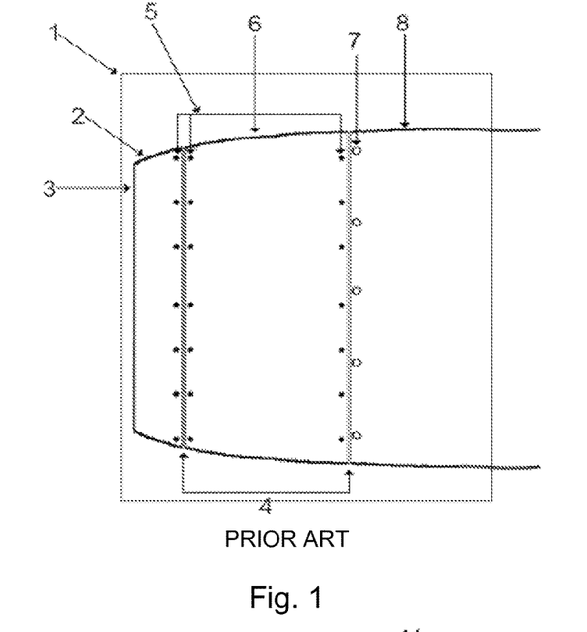
FIG. 1 is a schematic representation of a side view example of nacelle elements that are known to cause flow drag.

The present invention is directed to a system capable of mitigating flow drag and boundary layer separation over selected areas of the surface of an intake duct or nacelle. FIG. 1 shows a schematic representing an example of nacelle 1 segments (within square) that are known to cause flow drag, which includes the lipskin 2, the leading edge of the lipskin 3, the nose cowl 6, and the fan cowl 8. Rivets 5 are typically used to fasten the lipskin 2 to the nose cowl 6 and to fasten the nose cowl 6 to the fan cowl 8. Other fasteners are typically used to fasten the nose cowl 6 to the fan cowl 8 on the fan cowl 8 side of the interface of the two sections. A joint 4 is caused by the interface of the lipskin 2 to the nose cowl 6 and the nose cowl 6 to the fan cowl 8.

Figure 2:
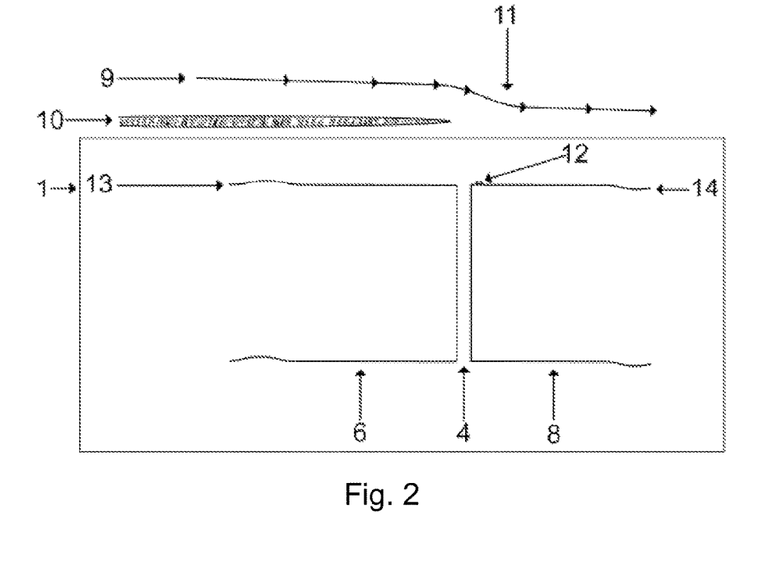
FIG. 2 is a schematic representation of a side view of one preferred embodiment of the present invention.

Referring now to FIG. 2, a schematic representation shows a side view example of a joint 4 at the intersection of the aft end of the nose cowl 6 and the forward end of the fan cowl 8, within the nacelle section 1. The aft end of one preferred embodiment of the mitigating device 10 extends over and covers the section 13 of the surface of the nose cowl 6 up to a point that is just forward of the aft end of the nose cowl 6 and the forward of the fan cowl 8. The air flow 9, beginning at the forward end of the nacelle 1, flows over one preferred embodiment of the mitigating device 10 and leaves the surface of the mitigating device 10 at an angle 11 which causes the air flow 9 to flow over the joint 4 and over the fastener 12 to mitigate drag caused by the fastener 12 and the joint 4. Airflow 11 continues over the uncovered section 14 of the fan cowl 8.

Figure 3:
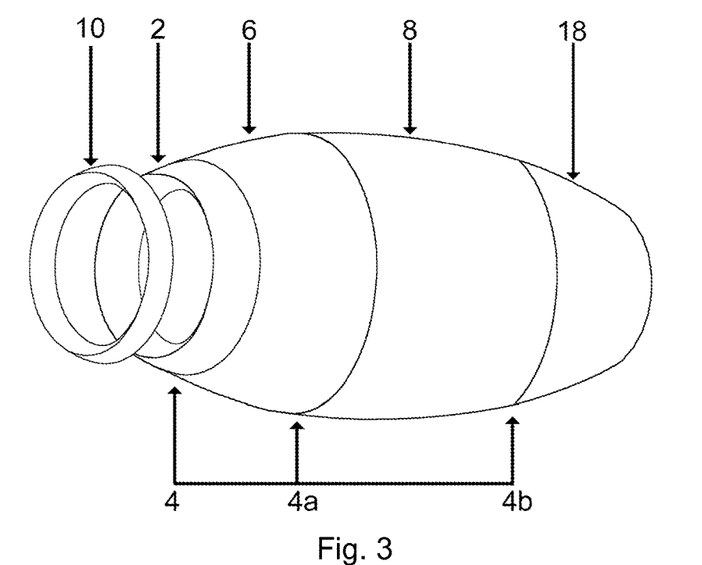
FIG. 3 is a schematic representation of a perspective view of another preferred embodiment of the present invention illustrating the system unconnected to a nacelle's lipskin.
Figure 4:
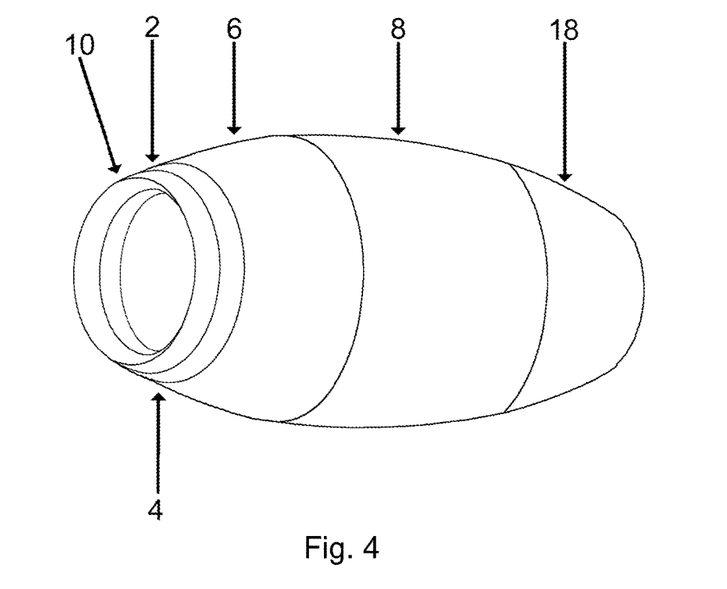
FIG. 4 is a schematic representation of a perspective view of another preferred embodiment of the present invention illustrating the system with a first connection to a nacelle's lipskin.

Referring now to FIG. 3, a schematic representation shows a perspective view of a preferred embodiment of the mitigating device 10 positioned away (for clarity) from the lipskin 2, the nose cowl 6, the fan cowl 8, and the thrust reverser 18. The joints 4, 4a, 4b are at the interface of each of those sections. FIG. 4 shows a schematic representation of a perspective view of a preferred embodiment of the mitigating device 10 having the first connection to lipskin 2 to mitigate drag that can be caused by a damaged lipskin 2 or to improve the aerodynamic shape or surface of lipskin 2. Any such drag will in turn affect the airflow over nose cowl 6, fan cowl 8, and thrust reverser 18. In this embodiment, the mitigating device 10 does not extend over the aft edge of lipskin 2 or over joint 4.

Figure 5:
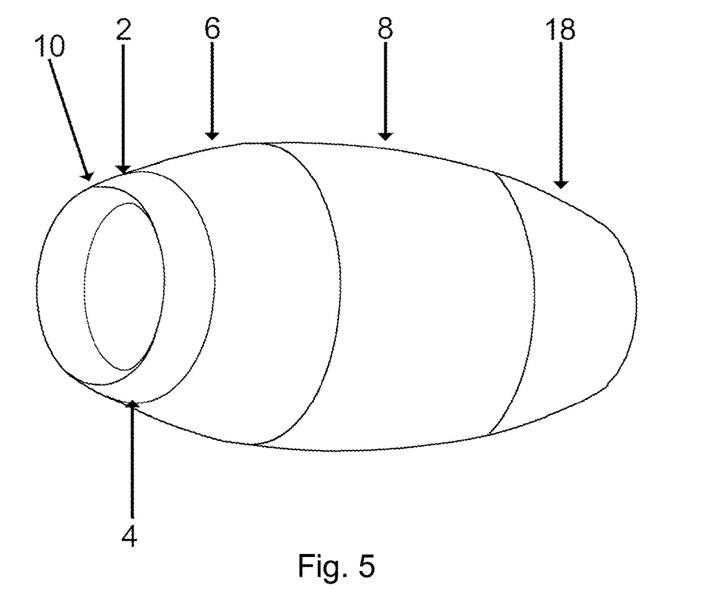
FIG. 5 is a schematic representation of a perspective view of another preferred embodiment of the present invention illustrating the system with a first connection to a nacelle's lipskin.

FIG. 5 shows a schematic representation of a perspective view of a preferred embodiment of the mitigating device 10 having a first connection to lipskin 2, extending over the aft edge of lipskin 2, and continuing over the leading edge of nose cowl 6. This embodiment mitigates drag that can be caused by rivets (not shown) in the aft edge of the lipskin 2 and rivets in the forward edge of nose cowl 6. Additionally, this embodiment of the mitigating device 10 covers or mitigates drag that can be caused by the joint 4 between lipskin 2 and nose cowl 6. The mitigating device 10 is capable of mitigating drag caused by lipskin 2, nose cowl 6, and join 4, promoting the continuation of laminar flow over fan cowl 8 and thrust reverser 18. The inner sleeve of mitigating device 10 is shown extending into the nacelle over the edge of lipskin 2 to mitigate drag from the inner rivets (not shown) and the inner interface joint 4 at the connection of lipskin 2 and nose cowl 6.

Figure 6:
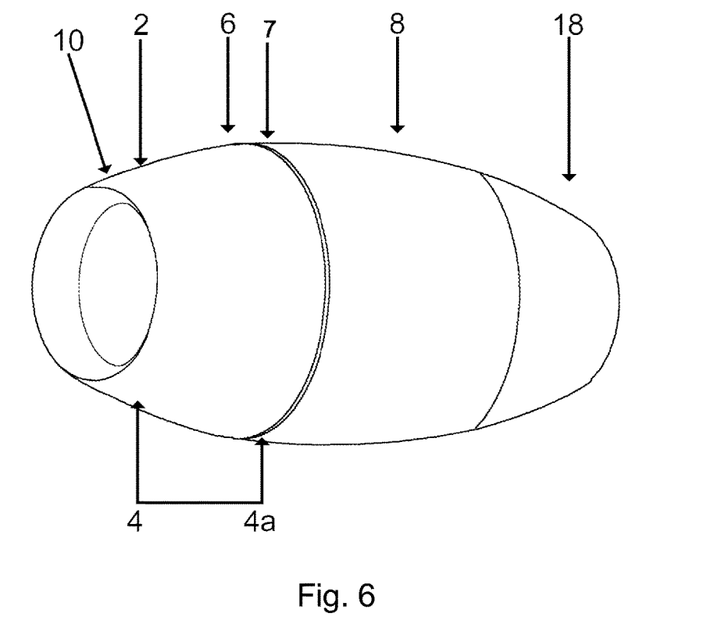
FIG. 6 is a schematic representation of a perspective view of another preferred embodiment of the present invention illustrating the system with a first connection to a nacelle's lipskin.

Another embodiment of the mitigating system is shown in FIG. 6. In this embodiment, the mitigating device 10 has a first connection at lipskin 2, extends over the aft edge of lipskin 2, and continues over the leading edge of nose cowl 6. The mitigating device 10 continues farther to the aft edge of nose cowl 6 just forward of the joint 4 and the fan cowl 8. In this embodiment the mitigating device 10 mitigates drag that can be caused by rivets (not shown) in the aft edge of lipskin 2, at the forward edge of nose cowl 6, and at the aft edge of nose cowl 6. Additionally, the mitigating device 10 covers or mitigates drag that can be caused by the joint 4 between lipskin 2 and nose cowl 6. The mitigating device 10 is also capable of mitigating drag caused by joint 4a between nose cowl 6 and fan cowl 8 by providing means for air flow to avoid contact with joint 4a and fasteners 7, which extend circumferentially about the surface of the leading edge of fan cowl 8. The inner sleeve of the mitigating device 10 is shown extending into the nacelle over the edge of lipskin 2 in order to mitigate drag from the inner rivets (not shown) and the inner interface joint 4 at the connection of lipskin 2 and nose cowl 6.

Figure 7:
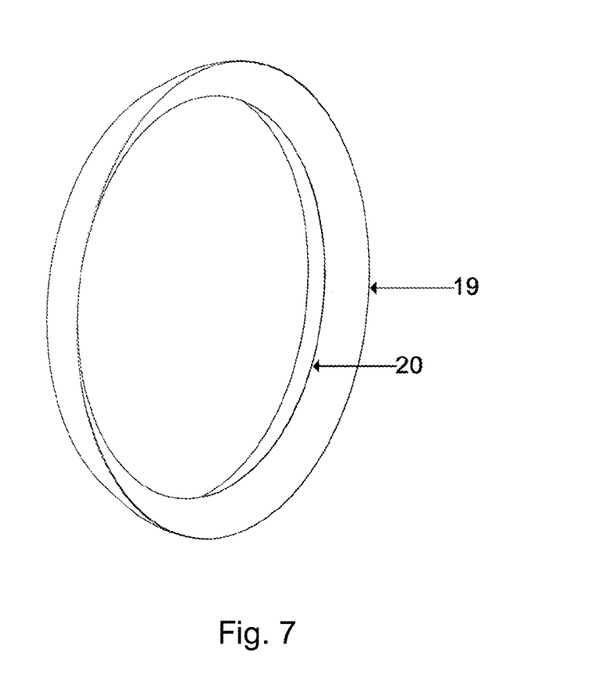
FIG. 7 is a schematic representation of a perspective view of one preferred embodiment of the present invention illustrating the system's inner and outer sleeves.

An additional embodiment of the mitigating system is shown in FIG. 7, which represents a perspective view of a preferred embodiment of the mitigating device 10 with separate outer 19 and inner 20 sleeves. The outer sleeves 19 and inner sleeves 20 are capable of being separately extended to any desired length. The inner sleeve 20 can be extended to cover potential boundary layer separations caused by rivets and seams, such as, but not limited to, the inner-nacelle interface where the lipskin is joined to the nose cowl by rivets within the inner nacelle throat. Additionally, either or both sleeves can contain or be coated or covered with specific materials, such as, but not limited to, acoustic absorbing materials.

Figure 8:
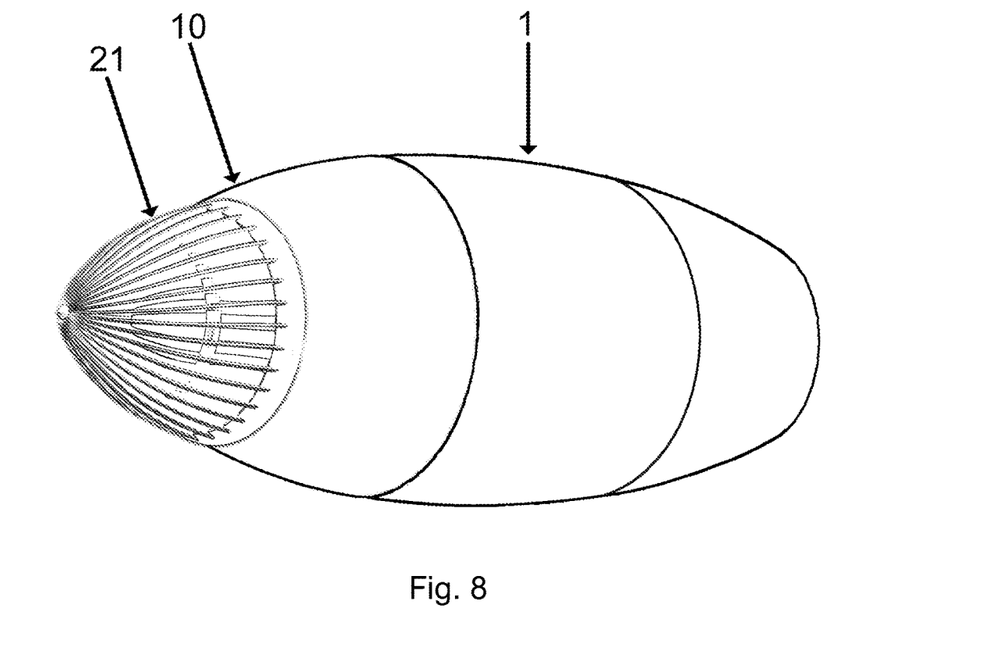
FIG. 8 is a schematic representation of a perspective view of one preferred embodiment of the present invention illustrating the system connected to a forward device.

Another embodiment is shown in FIG. 8, which shows a schematic representation of a perspective view of a preferred embodiment of the mitigating device 10 with an outside material or device 21 attached mechanically or non-mechanically to the leading edge of the mitigating device 10, which is attached to nacelle 1.

Figure 9:
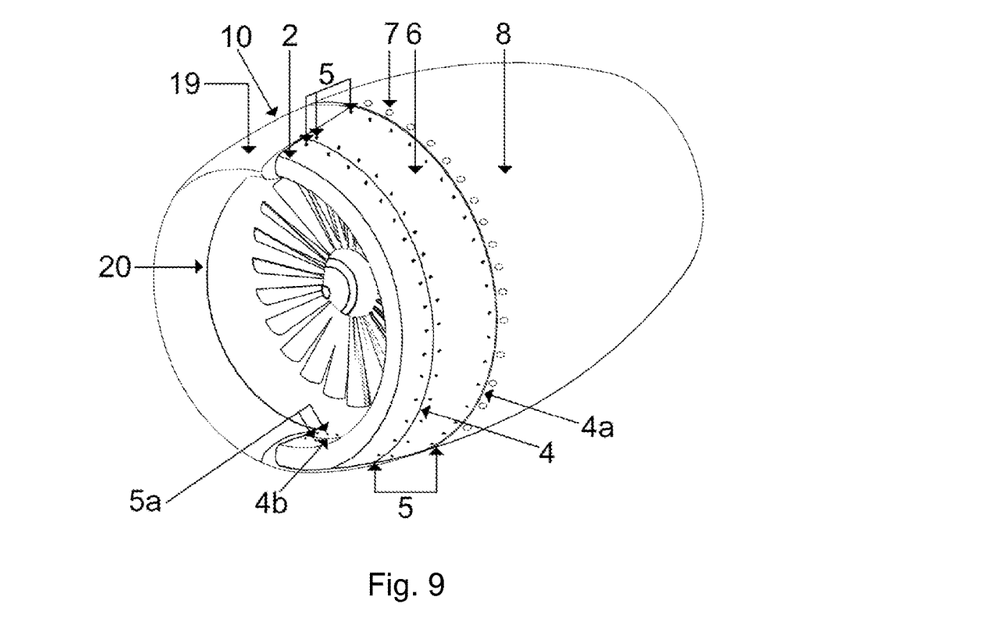
FIG. 9 is a schematic representation of a front perspective partial cut-away view of one embodiment of the present invention illustrating the outer and inner extended sleeves.

An additional embodiment of the mitigating system is shown in FIG. 9 with mitigating system 10 with an extended inner sleeve 20, which reduces drag and boundary layer separation caused by rivets 5a and the intersection 4b of the lipskin 2 and the nose cowl 6. The mitigating system 10 may also extend farther into the throat of the nacelle to mitigate flow drag and boundary layer separation from irregular or non-flush inner surface interfaces. The outer sleeve 19 extends over the rearward section of the lipskin 2, covering the forward-most rivets 5, and extends over the intersection 4, with the nose cowl 6 and further extends to cover the outer rivets 5 in the rearward section of nose cowl 6, and extending to a position forward of the intersection 4a of nose cowl 6 and fan cowl 8. The outer drag reduction system sleeve 19 reduces drag from rivets 5 on the outer surface of lipskin 2 and nose cowl 6 and confers the airflow streamline to transition over seam 4a and fasteners 7, reducing drag from those drag elements. In this and other embodiments, mitigating device 10 may be connected by adhesives or other means.

Figure 10:
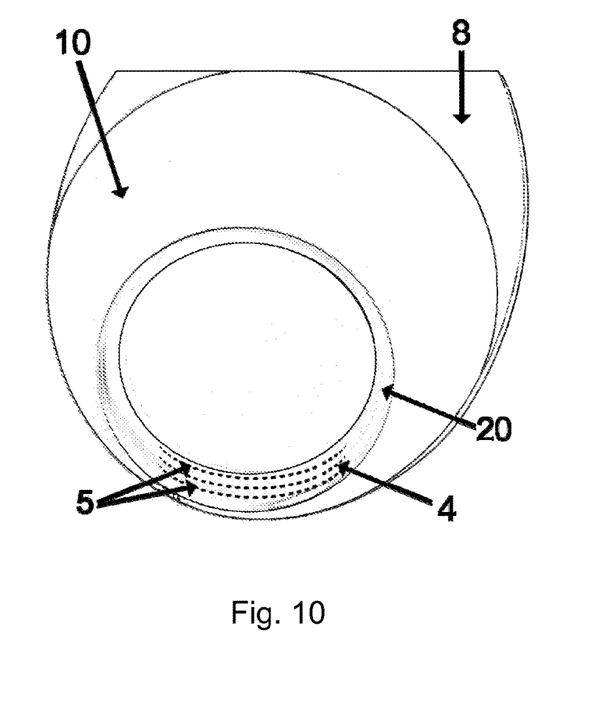
FIG. 10 is a schematic representation of a front perspective view of one preferred embodiment of the present invention illustrating the system's inner sleeve.

An additional embodiment of the mitigating system is shown in FIG. 10. This embodiment has an extended inner sleeve 20, which mitigates flow drag and boundary layer separation from rivets (represented by dotted lines 5) and from the interface joint (represented by dotted line 4). The mitigating system 10 may also extend farther into the throat of the nacelle to mitigate flow drag and boundary layer separation from irregular or non-flush inner surface interfaces.

In each of these various embodiments, the mitigating device 10 can extend beyond the aft outside edge of fan cowl 8 and can include portions that are removed or cutout where necessary. The mitigating device 10 is also capable of being interfaced into a nacelle, as a part or as the complete nacelle, such as, but not limited to, in an original equipment system. Still another embodiment of the mitigating device 10 can be used to replace an existing lipskin or can be used as a new lipskin where a current lipskin does not exist, such as, but not limited to, in an original equipment system. This lipskin system can interface with the nose cowl or be extended to interface with the fan cowl, or can be extended further to interface with the thrust reverser section. The mitigating system, in one embodiment, further comprises a thrust reverser section. The mitigating system is also capable of being retrofitted for existing aircraft or may be interfaced into a nacelle, as part or as the complete nacelle.

The mitigating device is also capable of being a nacelle inlet protective cover that is conformed to the existing lipskin and elongated to provide means to mitigate drag and boundary layer separations arising from the interface of the lipskin and nose cowl and/or the interface of the nose cowl and the fan cowl and/or the interface of the fan cowl and thrust reverser section. The mitigating system in any of the embodiments described herein is capable of being constructed of differing high strength-to-weight materials, such as, but not limited to, metals, metal alloys and/or powders, and composites and/or polymer materials.

In other embodiments, the mitigating device may be used in applications other than along the lipskin of engine nacelles, such as to cover other areas of aircraft that produce drag, including, for example, bulges along the fuselage or wings for antennas or other equipment, or along leadings edges such as wings, stabilizers, winglets, and canards. The mitigating device may be used as original equipment, as an add-on device to improve laminar flow, or as a means to cover a damaged area on an aircraft.

Unless otherwise stated, all technical and scientific terms used herein have the same meaning as commonly understood by one of ordinary skill in the art to which this invention belongs. Although any systems and materials similar or equivalent to those described herein can also be used in the practice or testing of the present invention, a limited number of the exemplary systems and materials are described herein. It will be apparent to those skilled in the art that many more modifications are possible without departing from the invent concepts herein. All terms used herein should be interpreted in the broadest possible manner consistent with the context.

The present invention has been described with reference to certain preferred and alternative embodiments that are intended to be exemplary only and not limited to the full scope of the present invention as set forth in the appended claims.

The invention claimed is:

1. A system for mitigating flow drag caused by airflow over a jet engine surface comprising:
   a. a housing having a first end and a second end, wherein said airflow moves from said first end of said housing toward said second end of said housing, further wherein said housing comprises flow drag elements, wherein said flow drag elements comprise a nose cowl having a first end and a second end and an inner surface and an outer surface, a fan cowl having a first end and a second end and an inner surface and an outer surface, and a lipskin having a lipskin leading edge and a second end and an inner surface and an outer surface;
   b. a first plurality of fasteners, wherein said first plurality of fasteners connects said second end of said lipskin to said first end of said nose cowl thereby creating a first joint, wherein said first plurality of fasteners is located at said second end of said lipskin;
   c. a second plurality of fasteners, wherein said second plurality of fasteners connects said second end of said lipskin to said first end of said nose cowl, wherein said second plurality of fasteners is located at said first end of said nose cowl;
   d. a third plurality of fasteners, wherein said third plurality of fasteners connects said second end of said nose cowl to said first end of said fan cowl thereby causing a cowl interface having a nose cowl side and a fan cowl side thereby creating a second joint, wherein said third plurality of fasteners is located on said nose cowl side of said cowl interface;
   e. a fourth plurality of fasteners, wherein said fourth plurality of fasteners connects said second end of said nose cowl to said first end of said fan, wherein said fourth plurality of fasteners is located on said fan cowl side of said cowl interface; and
   f. a mitigating device having an outer sleeve, wherein said outer sleeve has a first end and a second end, wherein said mitigating device is connected to said housing, further wherein said mitigating device directs said airflow over said flow drag elements thereby reducing flow drag caused by said flow drag elements.

2. The system of claim 1, wherein said mitigating device further comprises an inner sleeve having a first end and a second end.

3. The system of claim 2, wherein said second end of said inner sleeve of said mitigating device extends to a point on said inner surface of said lipskin before said second end of said lipskin.

4. The system of claim 2, wherein said second end of said inner sleeve of said mitigating device extends over said second end of said lipskin thereby covering at least a portion of said inner surface of said lipskin.

5. The system of claim 4, further wherein said second end of said inner sleeve of said mitigating device extends over said first joint thereby covering said first joint.

6. The system of claim 2, wherein said inner sleeve of said mitigating device comprises acoustic absorbing surfaces.

7. The system of claim 1, wherein said mitigating device is connected to said lipskin leading edge, wherein said second end of said outer sleeve of said mitigating device extends to a point on said outer surface of said lipskin before said second end of said lipskin.

8. The system of claim 1, wherein said second end of said outer sleeve of said mitigating device extends over said second end of said lipskin thereby covering at least a portion of said outer surface of said lipskin and covering at least a portion of said first plurality of fasteners.

9. The system of claim 8, further wherein said second end of said outer sleeve of said mitigating device extends over said first joint thereby covering said first joint.

10. The system of claim 9, further wherein said second end of said outer sleeve of said mitigating device extends over said first end of said nose cowl to a point on said outer surface of said nose cowl before said second end of said nose cowl thereby covering a portion of said outer surface of said nose cowl and thereby covering said second plurality of fasteners.

11. The system of claim 10, further wherein said second end of said outer sleeve of said mitigating device extends over said second end of said nose cowl thereby covering said outer surface of said nose cowl and thereby covering said third plurality of fasteners.

12. The system of claim 1, wherein said outer sleeve of said mitigating device comprises acoustic absorbing surfaces.

13. The system of claim 1, further comprising an outside device attached to said first end of said mitigating device.

14. The system of claim 1 wherein said housing is a nacelle.

15. The system of claim 1, wherein said mitigating device comprises an anti-icing device.

16. A mitigation device for reducing drag on an aircraft surface, the mitigation device comprising:
    a. an outer sleeve, wherein said outer sleeve has a first end and a second end;
    b. an inner sleeve having a first and second end,
    wherein said mitigating device is attached to said aircraft surface and wherein said mitigating device comprises a smooth mitigation device surface such that it directs airflow over said aircraft surface thereby reducing flow drag caused by flow drag elements of said aircraft surface, wherein said aircraft surface is a lipskin comprising an inner surface and an outer surface and a first and second end, and wherein said second end of said outer sleeve of said mitigating device extends to a point on said outer surface of said lipskin before said second end of said lipskin, further wherein said second end of said inner sleeve of said mitigating device extends to a point on said inner surface of said lipskin before said second end of said lipskin, further wherein said second end of said outer sleeve of said mitigating device extends over said second end of said lipskin thereby covering at least a portion of said outer surface of said lipskin, further wherein said second end of said inner sleeve of said mitigating device extends over said second end of said lipskin thereby covering at least a portion of said inner surface of said lipskin, and further wherein said aircraft surface further comprises a nose cowl comprising a first end and a second end and connected to the lipskin and defining a first joint therebetween, further wherein said second end of said outer sleeve of said mitigating device extends over said first joint thereby covering said first joint.

17. The mitigation device of claim 16, further wherein said second end of said inner sleeve of said mitigating device extends over said first joint thereby covering said first joint.

18. The mitigation device of claim 17, further wherein said second end of said outer sleeve of said mitigating device extends over said first end of said nose cowl to a point on said outer surface of said nose cowl before said second end of said nose cowl thereby covering a portion of said outer surface of said nose cowl.

19. The mitigation device of claim 18, further wherein said second end of said outer sleeve of said mitigating device extends over said second end of said nose cowl thereby covering said outer surface of said nose cowl.

* * * * *